J. GOOD.
LIQUID FUEL BURNER.
APPLICATION FILED MAY 17, 1918.

1,366,787.

Patented Jan. 25, 1921.

INVENTOR
John Good
BY
ATTORNEY

UNITED STATES PATENT OFFICE.

JOHN GOOD, OF BROOKLYN, NEW YORK.

LIQUID-FUEL BURNER.

1,366,787. Specification of Letters Patent. Patented Jan. 25, 1921.

Application filed May 17, 1918. Serial No. 235,096.

*To all whom it may concern:*

Be it known that I, JOHN GOOD, United States citizen, residing in Brooklyn, New York, have invented the following described Improvements in Liquid-Fuel Burners.

The invention consists in means for supplying liquid fuel to inclosed burners and its object is to insure a proper supply of fuel from a tank or receptacle situated at a lower level than the level of the burner, as for example when such burners are used for heating engine intakes and derive their fuel from the carbureter float chambers. The invention also provides for the proper elevation of the liquid fuel when the burner is operated by pressure differences so low as not to be capable of raising a solid liquid column to the burner, all as hereinafter more fully explained.

In the accompanying drawing—

Figure 1:
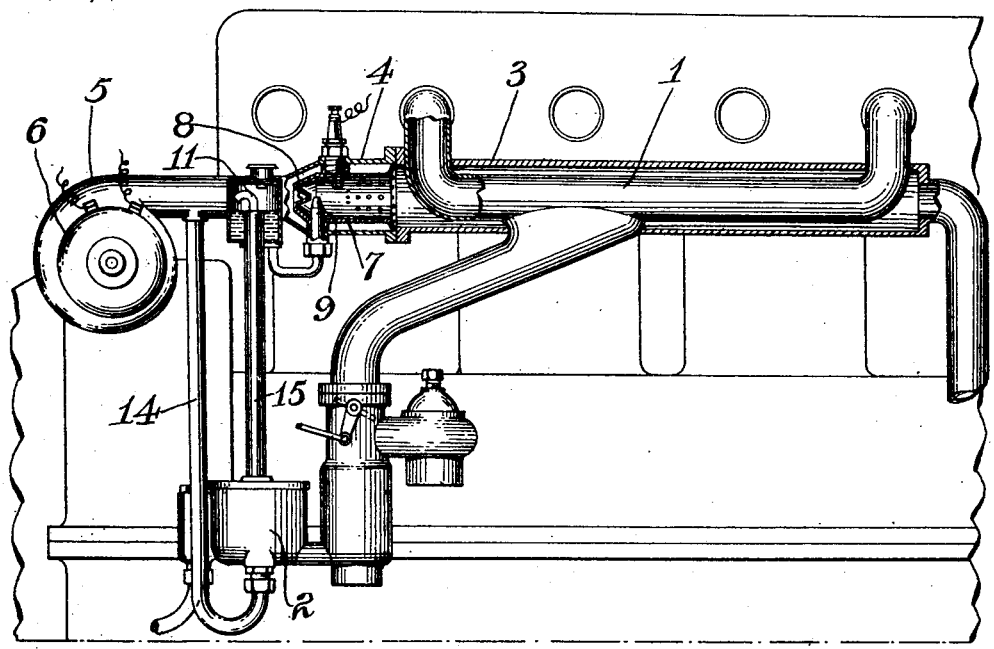
Figure 1 represents the application of the burner and its fuel supplying means to an ordinary automobile engine.
Figure 2:
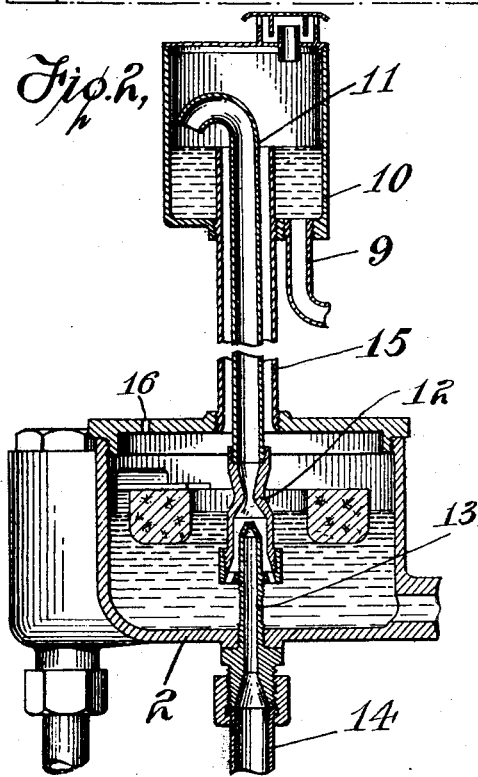
Fig. 2 is a vertical section through the carbureter float chamber and the burner fuel chamber.

The invention is shown in connection with an internal combustion engine having an intake 1 and a usual carbureter with a float-controlled fuel receptacle 2. The intake manifold is enveloped in a jacket 3 constituting the flame passage of an inclosed liquid fuel burner 4 which is operated by air pressure supplied to it by a fan blower 5 operated by a motor indicated at 6. The burner may be variously constituted for the purposes of this invention and is shown as comprising an inner perforated shell containing a spark plug, an air jet nozzle 8 and a liquid nozzle 9, these parts being organized as disclosed in my co-pending application Serial No. 195,506, filed on or about October 9, 1917, and supplied with proper electric connections so that the starting of the fan blower motor will produce instant ignition and steady combustion thereby heating the engine and preparing it for working on its normal cycle.

The fuel nozzle 9 receives fuel from a chamber 10 adjacent to it and shown in the drawings as at about the same level. This chamber has a fuel connection 11 extending downwardly to the receptacle 2 of the engine carbureter and terminating in a small Venturi tube 12 having its entrance below the liquid level in the receptacle. A nozzle 13, pointing into the Venturi tube, is connected by pipe 14 to the delivery of the fan blower so that part of the air flow created through the burner is transmitted to and delivered by the nozzle 13 into the open end of the fuel connection 11. Thereby a mixture of air and fuel is caused to move upwardly in said connection 11 into the chamber 10 filling the latter up to the level of the overflow 15 which returns any excess back to the carbureter fuel receptacle. The overflow pipe 15 is shown in the drawing as concentric to the fuel connection 11 but may, of course, be otherwise arranged. By reason of the injector action of the nozzle 13 and Venturi tube 12, low fan pressures can be utilized to raise an adequate fuel supply to very considerable elevations, quite sufficient to accommodate the conditions obtaining in ordinary automobile and power boat power plants. It will be appreciated that the action is made possible by virtue of the mixing of air with the column of liquid in fuel connection 11 which reduces its weight, the flow of air being sufficient to maintain an upward velocity of mixed air and liquid suited to supply the needs of the burner, that is to say to produce a desired rate of combustion therein.

The use of this air-lifting principle for supplying fuel from a carbureter float receptacle to an engine-heating burner represents the essence of my invention and may obviously be applied in different ways for this purpose, but however used, enables the burner to be mounted directly on the intake manifold, or at a high point on the engine, while deriving its fuel directly from the carbureter float receptacle which in many engines must be located at a considerably lower level than the manifold, or at least lower than the most efficient location for the burner. The invention thus eliminates not only the expense and complication of a separate float-controlled receptacle for the burner, but also the collateral apparatus that would be needed for delivering fuel to such a receptacle. In automobile equipment, the desirable burner location is near the intake ports and generally above the level at which it can be supplied with fuel by gravity from a fuel tank in any ordinary location, and in many automobiles it is not convenient to raise the fuel by applying pressure to the main tank. This invention thus comprehends the combination of a carbureter having its float receptacle at a lower level suitable for its best operation, and a burner at a higher level suitable for its most effective action, but deriving its fuel supply from said receptacle through the intervention of a flowing column of air mixed with liquid fuel, the weight of which can be rapidly lifted by the relatively small force available for burner operating purposes.

In the specific exemplification of the invention above described, the local burner reservoir 10 is vented to atmosphere and delivery of fuel pressure takes place by reason of the aspirating action of the air jet 8. Suitable proportions of air and fuel in the burner are thus maintained. The carbureter float-controlled receptacle is provided with a vent to atmosphere, marked 16.

Claims:

1. The combination of an engine having an intake passage and a carbureter whereby it is supplied with combustible mixture, a float-controlled fuel receptacle to supply the carbureter with liquid fuel, a burner for heating the fuel supplied to the engine located at a high point on the engine and above the level of said receptacle, and means for conducting fuel from the receptacle to the burner comprising another passage in which the fuel from said receptacle is mixed with an ascending air column and carried thereby to its place of use in the burner structure.

2. The combination of an engine having an intake passage and a carbureter whereby it is supplied with combustible mixture, a constant level liquid fuel receptacle to supply the carbureter with fuel, a burner for heating the fuel supplied to the engine located on or adjacent to said intake and above said receptacle, means for causing air flow to the burner for combustion purposes, and means for conducting fuel from said receptacle to the burner comprising a passage in which fuel from said receptacle is mixed with an ascending air column, said air column being moved by the air-flow-causing means.

3. The combination of an engine having an intake passage and a carbureter whereby it is supplied with combustible mixture, a constant level fuel receptacle to supply the carbureter with liquid fuel, a burner for heating the fuel supplied to the engine located at a high point on the engine and above the level of said receptacle, a local fuel reservoir for the burner and means for conducting fuel from said receptacle to said reservoir comprising a passage in which fuel from said receptacle is mixed with an ascending air column and carried thereby to said reservoir.

4. The combination with a fuel burner comprising means for creating an air flow therethrough and a liquid fuel chamber supplying fuel to the air flow, of a fuel receptacle at a lower level than said chamber, a fuel connection between said receptacle and chamber and means for delivering part of the air flow into said receptacle to create upward delivery of fuel to said chamber.

5. The combination with a fuel burner comprising means for creating an air flow therethrough and a liquid fuel chamber for supplying fuel to the air flow, of a fuel receptacle at a lower level than said burner, a fuel connection between said chamber and receptacle, means for delivering part of the air flow into said receptacle to create upward delivery of fuel to said chamber, and an overflow from said chamber for surplus fuel.

6. The combination of a liquid fuel burner, a source of air pressure connected thereto, a float-controlled fuel receptacle at a lower level than said burner, a fuel connection between said receptacle and burner, and means for transmitting pressure from said source to said float-controlled receptacle to deliver fuel therefrom to said burner, said receptacle being provided with means for admitting atmospheric pressure to it when the burner is not in operation.

7. The combination with an engine intake passage and carbureter, and a fuel burner having its flame passage in heating relation to said intake passage, of a fuel connection between the burner and the fuel receptacle of said carbureter, a source of fluid pressure to operate said burner, and means for transmitting said pressure to the carbureter to cause delivery of fuel therefrom to said burner.

8. The combination of an internal combustion engine, a carbureter therefor, a motor-operated inclosed liquid fuel burner having its flame passage in heating relation to said engine, a liquid fuel connection extending downwardly from said burner to the fuel receptacle of said carbureter, a pressure source to operate the burner and a connection from said source to said receptacle to deliver liquid fuel upwardly therefrom to supply the burner.

9. The combination of a liquid fuel burner, a carbureter having a fuel receptacle at a lower level than said burner, a liquid connection between said burner and receptacle, means for creating an air flow through said burner, and a connection subjecting the liquid of said receptacle to the effect of said means to move the liquid through said liquid connection.

10. The combination of a fuel burner provided with a liquid fuel nozzle, a constant level fuel chamber supplying said nozzle and at substantially the same level, a fuel receptacle at a lower level than said nozzle, a liquid connection between said receptacle and chamber, and a source of fluid pressure exerting its effect on the liquid of said receptacle to move the liquid fuel through said connection and operating said burner.

In testimony whereof, I have signed this specification.

JOHN GOOD.